United States Patent
Tousain et al.

[11] Patent Number: 6,163,429
[45] Date of Patent: Dec. 19, 2000

[54] LEARNING TO COMPENSATE FOR RANDOMLY OCCURRING SHOCKS

[75] Inventors: Rob Tousain, Wateringen, Netherlands; Jean-Christophe Boissy, Paris, France

[73] Assignee: U.S. Philips Corporation, New York, N.Y.

[21] Appl. No.: 09/049,554

[22] Filed: Mar. 27, 1998

[30] Foreign Application Priority Data

Apr. 22, 1997 [FR] France .................................... 97 04939

[51] Int. Cl.[7] .................................................. G11B 5/596
[52] U.S. Cl. .......................... 360/77.04; 360/75; 318/560
[58] Field of Search .................................... 360/75, 77.02, 360/77.04, 78.04, 78.09; 369/19, 43; 340/669; 318/638, 646, 651, 560, 563, 565, 566

[56] References Cited

U.S. PATENT DOCUMENTS

| 5,245,830 | 9/1993 | Aubrun et al. |
| 5,426,545 | 6/1995 | Sidman et al. |
| 5,491,676 | 2/1996 | Yamaguchi et al. |
| 5,563,794 | 10/1996 | Cosner et al. |
| 5,835,298 | 11/1998 | Edgerton et al. ......................... 360/75 |

FOREIGN PATENT DOCUMENTS

6-20411  1/1994  Japan ...................................... 360/75

OTHER PUBLICATIONS

Yosuke Hamada et al: "Repetitive Learning Control System Using Disturbance Observer For Head Positioning Control System Of Magnetic Disk Drives", IEEE Transactions On Magnetics, vol. 32, No.5, Sep. 1996, pp. 5019–5021, XP000634207.

*Primary Examiner*—Alan T. Faber
*Attorney, Agent, or Firm*—Michael E. Belk

[57] ABSTRACT

In a control system, a shock resulting in an error is detected. The detection of the shock initiates compensation to reduce the error. The compensation depends on corrective data contained in a memory of the player. The error while being reduced by the compensation is measured, and the corrective data is updated depending on the measured error.

11 Claims, 4 Drawing Sheets

LEARNING TO COMPENSATE FOR RANDOMLY OCCURRING SHOCKS

FIELD OF THE INVENTION

The invention relates to reduction of an error caused by a shock. For example, in an optical or magnetic disk player, a shock may cause an error in reading out information which is stored on the disk.

BACKGROUND OF THE INVENTION

U.S. Pat. No. 5,426,545 describes a disturbance compensation system for compensating disturbances which may occur when a disk drive is operated. The disturbing event is, for example, a shock or a vibration. The system measures the disturbance created by the acceleration of the disk and then supplies a correction signal which, after being filtered, is used for compensating the effects of the shock or the vibration. The system makes use of an angular acceleration sensor. The method works continuously, that is to say, that the accelerometer operates permanently while the correction signal is calculated without interruption.

An accelerometer is a sophisticated component and thus costly. Its use makes particular arrangements necessary of the servo control system.

SUMMARY OF THE INVENTION

It is an object of the invention to provide error reduction which allows relatively cost-efficient implementations. The invention relates to a method of reducing an error, an information read-out arrangement, a servo system, and a controller respectively, in accordance with the invention. Additional features, which may be optionally used to implement the invention to advantage, are defined in the dependent claims.

The invention takes the following aspects into consideration. In various applications, shocks may occur which are substantially similar in nature. For example, in a disk player, a disk drive mechanism may produce a shock each time a disk is accelerated. The shock may temporarily cause an error in a position of a disk read head. If a plurality of such shocks occur, the respective errors will be substantially similar in form and amplitude. Consequently, if a compensation reduces the error caused by a certain shock, the same compensation can also be applied to reduce the error caused by a subsequent shock.

In accordance with the invention, a shock which causes an error is detected and, when the shock has been detected, the error is compensated for on the basis of corrective data contained in a memory. The corrective data may be, for example, fixed and written into the memory during a manufacturing process. The corrective data may also be defined in a learning process and repetitively updated. In any case, storing the corrective data can generally be achieved at moderate cost. Shock-detection and error compensation on the basis of the corrective data can also generally be achieved at moderate cost. For example, the aforementioned functions may be carried out by a microcontroller which, in an application, is already required for other functions. What is more, since the invention compensates for errors caused by shocks, any other form of error-reduction, such as a servo system, will have an easier task and, consequently, can be relatively simple. Thus, the invention allows relatively cost-efficient implementations.

Advantageously, while being reduced in accordance with the invention, the error is measured, and the corrective data is updated on the basis of the measured error. This allows a learning process in which the compensation gradually becomes more and more effective with each subsequent shock in a sequence of shocks.

These and other aspects of the invention will be apparent from and elucidated with reference to the embodiments described hereinafter.

DESCRIPTION OF PREFERRED EMBODIMENTS

According to a preferred application, the invention is described first in the case of the control of the position of the read arm of a hard disk of an information system. Only an exemplary embodiment is concerned, because the invention may be utilized in other applications which make use of servo systems such as the recording and reproduction of audio or video signals or, more generally, in automatic applications which ask for a servo control of dynamic systems. A second exemplary embodiment which applies to the control of a glass tube production line will also be briefly described.

Figure 1:
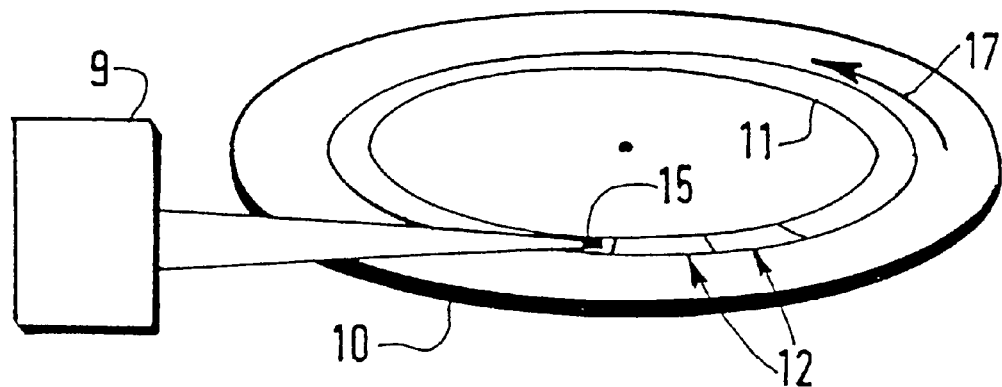
FIG. 1: shows a diagram of a hard disk with a read/write head.

FIG. 1 represents a disk 10 comprising tracks 11 subdivided into sectors 12 in which data are stored. A read/write head 15 permits to read the data stored on the tracks. The disk moves and rotates in the direction of the arrow 17. In operation, the head 15 is to remain correctly positioned over the track 11, so that the data are correctly read or written. If a shock occurs, the read head is no longer correctly positioned and a positioning error appears. Servo means 9 permit of controlling the parameters which characterize the position of the head 15 to provide that the errors are the smallest possible.

Figure 2:
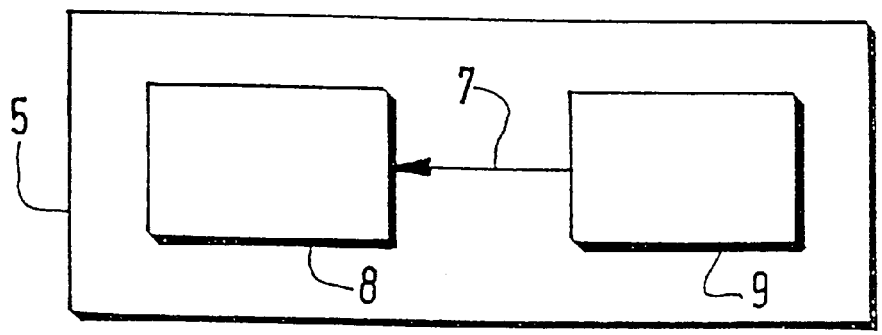
FIG. 2: represents a diagram showing a servo system formed by a servo unit coupled to a controller.

FIG. 2 represents in a diagram a servo system 5 formed by a servo unit 8 to be controlled (here a disk unit) and a controller 9 which gives commands 7 to the servo unit 8.

To reach the servo point, the servo unit may be characterized by various parameters. By way of example, one may choose to take the position P of the read head into account.

When a disturbing event occurs, for example, a shock, the signal following the position of the head will exhibit a disturbance. According to the invention, the method begins by detecting the appearance of the disturbance, which triggers the measurement of an error. This error is sampled to obtain an error vector which is filtered to form a correction vector which itself is used for generating a correction signal used for compensation of the effects of the disturbing event. The same method is used with each subsequent disturbance, but corrections which have already been made previously are taken into account then.

Figure 6:
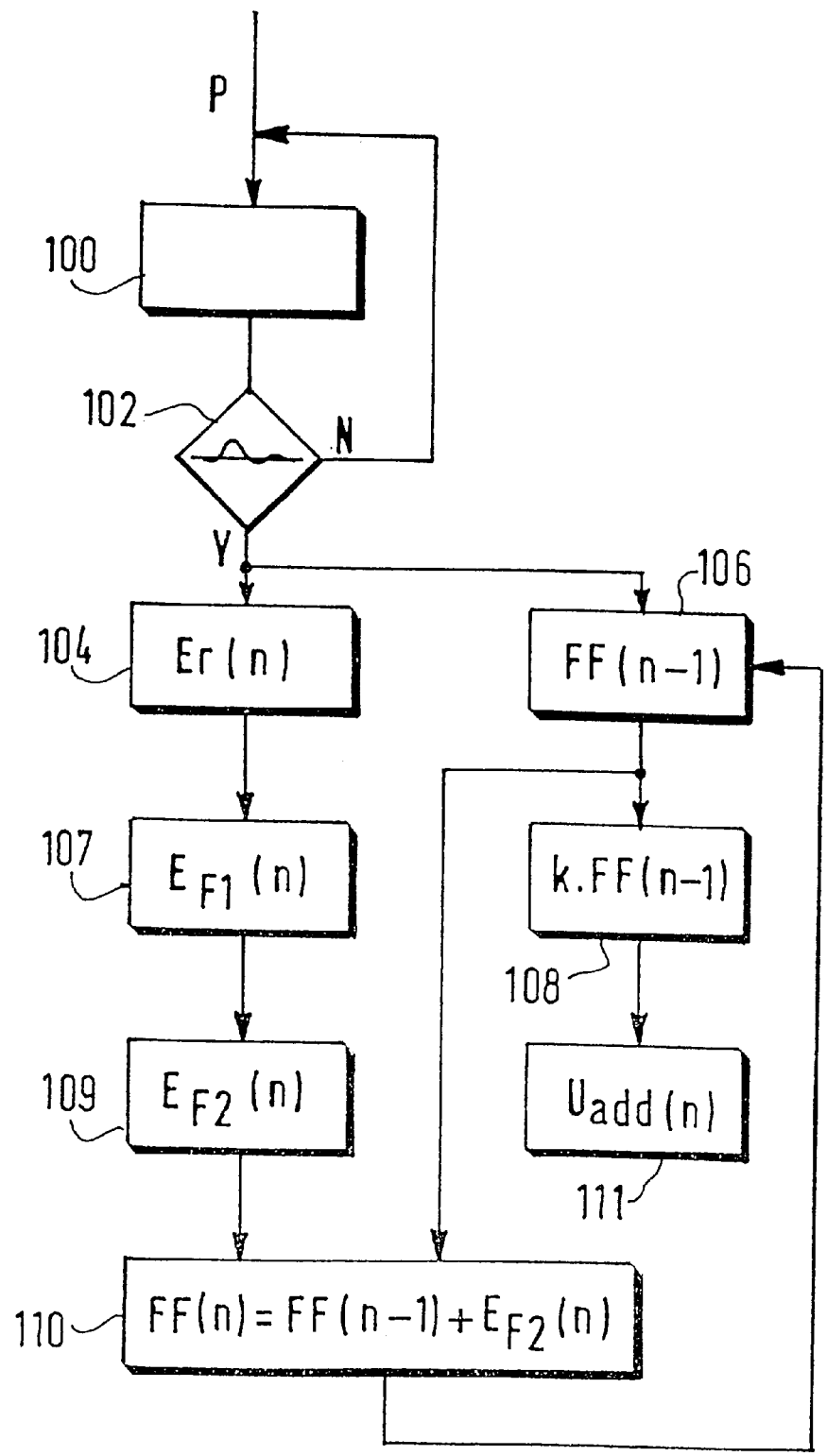
FIG. 6: represents a flow chart of the various steps of the method according to the invention.

FIG. 6 indicates the various steps of the method according to the invention. Step 100 relates to the detection of the shock. Step 102 consists of regularly testing whether a shock has occurred by measuring the position P of the read head and by carrying out a filtering with a detection filter. As long as a shock has not been detected (negative response N), the standby method remains activated. When a shock is detected (positive response Y), an error vector Er(n) is determined (step 104) by taking various samples of the error signal. This error vector characterizes the position error of the read/write head. Let us consider the shock of the order n appearing at the instant $t_n$. At this instant, the method comprises two phases which evolve in parallel:

a first phase during which the method corrects the disturbance which has just been detected at the instant $t_n$;

a second phase during which the method calculates data which are to be used for the next cycle.

Let us first consider the second phase. After the detection of the disturbance, the method determines the error vector Er(n) (step 104) formed by N samples of the detected error signal. This error vector undergoes a first filtering (step 107) which produces a filtered error $E_{F1}(n)$. The first filtering is obtained by an approximation of the inverse of the sensitivity function which is stable. The sensitivity function may be calculated via the relation T/(1+TC) where T represents the transfer function of the system 23 and where C represents the transfer function of the linear controller 22. The filtered error $E_{F1}(n)$ undergoes a second filtering (step 109), the second filtering being a low-pass filtering which produces a filtered error $E_{F2}(n)$. The method then determines (step 110) the correction vector FF(n), so that:

$$FF(n)=FF(n-1)+E_{F2}(n),$$

where FF(n-1) is the correction vector calculated after the preceding shock.

This vector FF(n) is then stored in a memory (step 106) to be used after the detection of the next disturbance.

Let us now consider the first phase. The correction vector FF(n-1), calculated at the instant $t_{n-1}$, has been stored in the memory (step 106). The method calculates at instant $t_n$ the contribution which the vector FF(n-1) is to make to correct the disturbance detected at instant $t_n$.

Therefore, the correction vector FF(n-1) is weighted (step 108) with a weight factor k. This weighted correction vector is used for generating the correction signal $u_{add}(n)$ which is used by the controller for correcting the disturbance:

$$u_{add}(n)=k.FF(n-1).$$

Thus, gradually, the method takes into account (step 110) all the contributions determined previously for supplying a correction signal $u_{add}(n)$ updated with each detection of a new disturbance.

Figure 3:
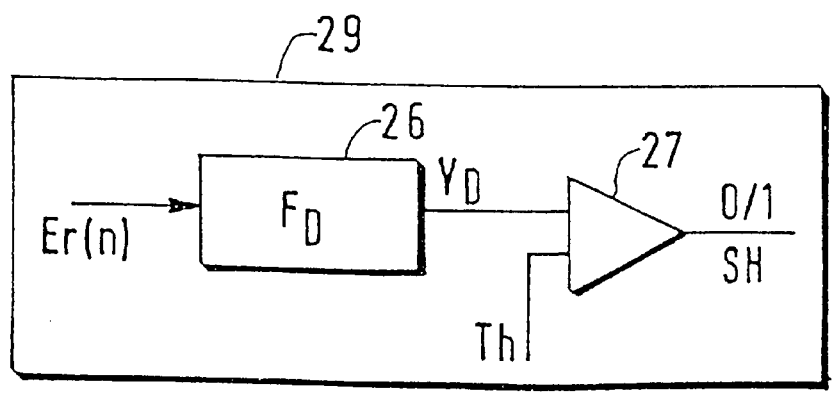
FIG. 3: shows a diagram of a shock detector.
Figure 5:
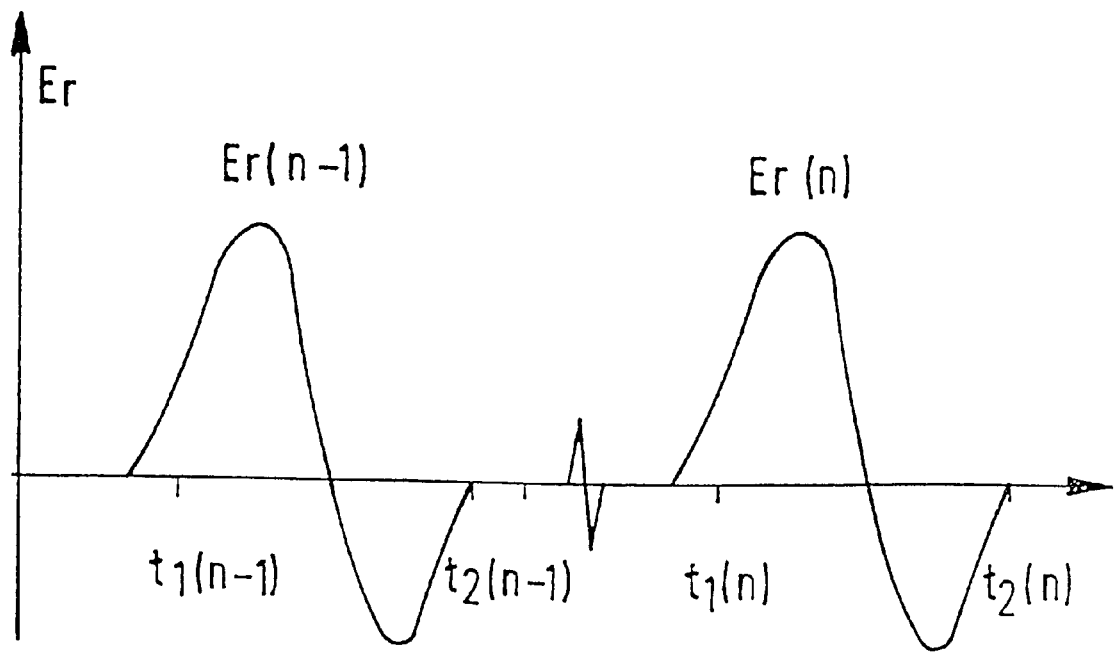
FIG. 5: represents error signals showing two successive disturbances.

FIG. 5 shows the error signals generated by two consecutive shocks. One shock is detected when the output of the detection filter is higher than a predetermined threshold Th (FIG. 3). The successive shocks are supposed to create error signals which have substantially the same shapes. In FIG. 5, the error signal Er(n-1) appears between the instants $t_1(n-1)$ and $t_2(n-1)$. A next shock causes an error signal Er(n) to occur between the instants $t_1(n)$ and $t_2(n)$. By taking into account the error signals only after the shocks have been detected, everything happens in practice as if the error signals Er(n-1), Er(n) were sent in succession, which permits the invention to utilize a learning technique based on the technique of repetitive control. This is made possible by the fact that a periodic character is given to the disturbances by taking the error signal only into account when each disturbance is detected. In this manner, the periodic sequence of disturbances is thus to be compensated by a periodic correction signal.

Figure 4:
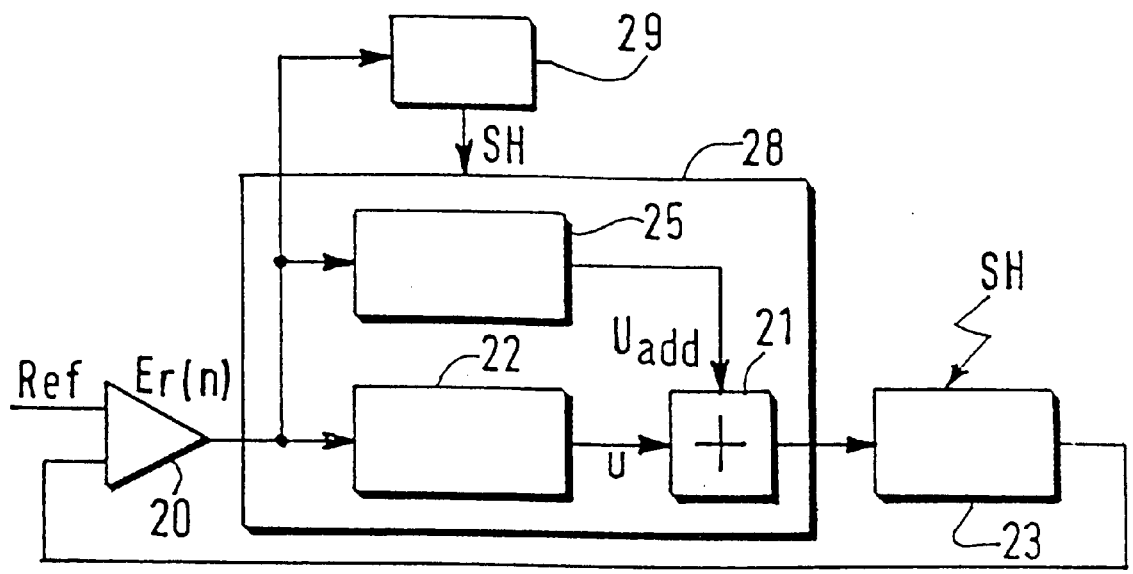
FIG. 4: shows a general diagram of a servo system implementing the method according to the invention.

The diagram of the servo system comprising its controller operating according to the correction method explained is represented in FIG. 4. It comprises a servo unit 23, for example, a disk unit, which may receive a disturbing event SH, for example, a shock. This shock causes a disturbance of the position of the read head. This position is followed permanently and compared in a comparator 20 with a position reference Ref. When a difference of position appears, the comparator 20 produces the error Er(n) at the instant $t_n$. The servo system comprises a controller 28 which is preferably formed by a known linear controller 22 whose action is completed by repetitive control means 25 according to the invention. The correction signal u produced by the known controller 22 is added in the adder means 21 to the contribution $u_{add}$ produced by the repetitive control means.

The appearance of a shock SH is detected by a shock detector 29. The shock detector may be the one represented in FIG. 3. The measured position error Er(n) is filtered in a correlation filter 26 which produces a signal $Y_D$ which is compared with a threshold Th in the comparator 27. This comparator produces a binary output 0/1 which indicates whether a shock has (SH=1) or has not been detected (SH=0).

The repetitive control means 25 may be formed by a computer which implements the method described previously (FIG. 6).

With reference to FIG. 5, the various steps of the method plotted against time are the following:

$t_1(n-1)$: detection of the shock of the order n-1;

$t_1(n-1)$ to $t_2(n-1)$: application of the correction signal $u_{add}(n-2)$;

$t_1(n-1)$ to $t_2(n-1)$: measurement of the error Er(n-1), filtering of Er(n-1) and calculation of FF(n-1);

$t_2(n-1)$ to $t_1(n)$: waiting for a next shock;

$t_1(n)$: detection of the shock of the order n;

$t_1(n)$ to $t_2(n)$: application of the correction signal $u_{add}(n-1)$;

$t_1(n)$ to $t_2(n)$: measurement of the error Er(n), filtering of Er(n) and calculation of FF(n).

Figure 7:
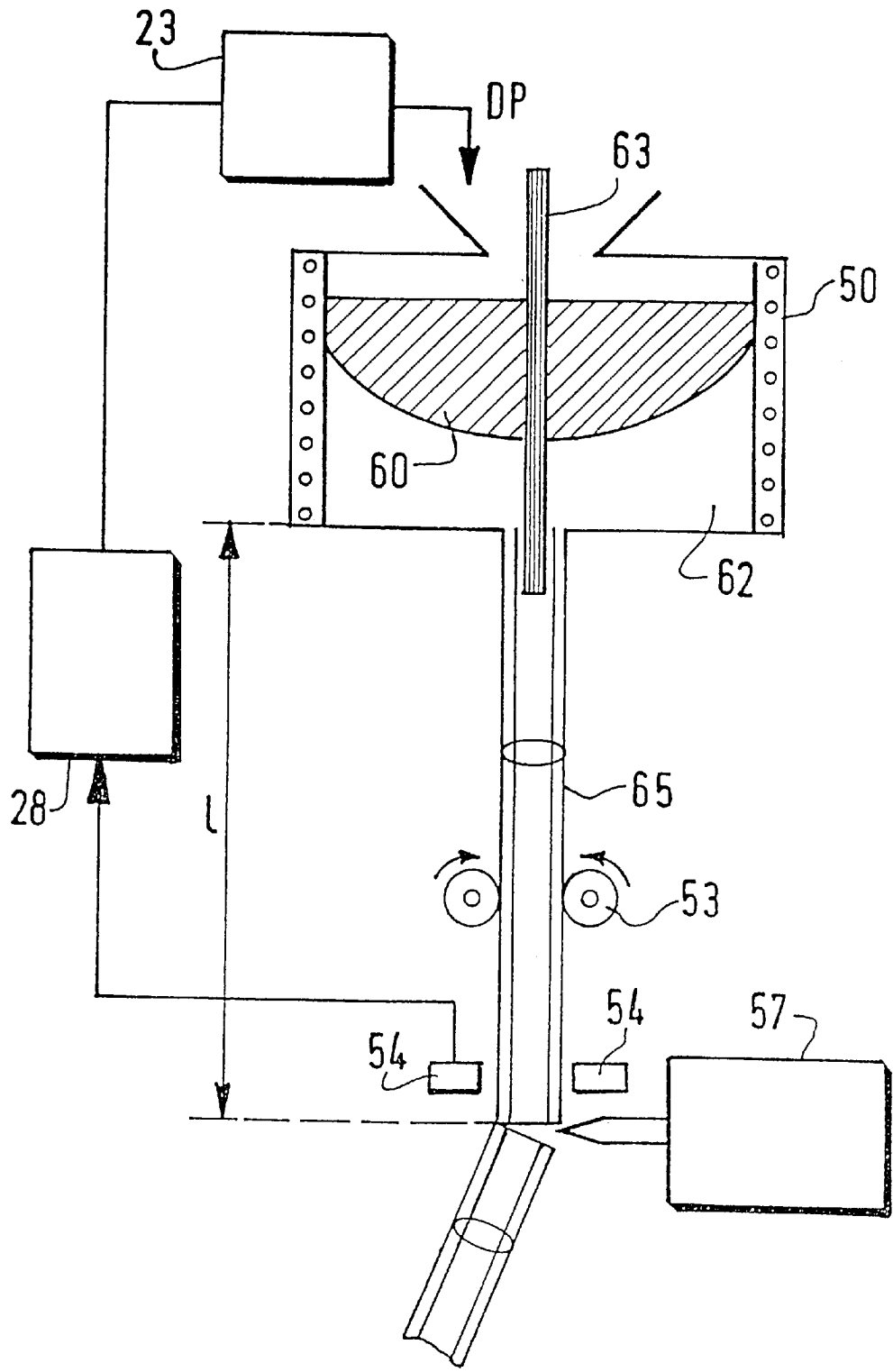
FIG. 7: represents a diagram of a glass tube production system in which the invention is utilized.

FIG. 7 represents in a diagrammatic manner another way of applying the invention. The Figure relates to the control of the production process of glass tubes intended to be used as flash tubes. Sand 60 is poured into a furnace 50 to obtain liquid glass 62. The sand/liquid glass assembly has a drawing kernel 63 passed through it which is used for forming a hollow tube 65 formed by drawing with two drawing rollers 53. The tube is cut off in pieces having a length L of about 4 m with the aid of a cutting device 57. When the tube is cut into sections, the mass of liquid glass 62 undergoes a drop of pressure DP, so that the result is a variation of the diameter of the part of the tube situated at the output of the furnace.

When glass tubes of this type are produced, an overpressure is currently applied at the input of the furnace to compensate the drop of pressure caused by the cutting of the tube. This overpressure is generally the result of the experience of the person charged with the monitoring of the production process. It is desirable to automate such a production process and take the disturbing event into account which occurs cyclically. This makes it possible to utilize the technique of repetitive control which forms the object of the invention.

For applying the invention, there will be considered that the drop of pressure which is the disturbing event happens from time to time and presents similar characteristics each time it occurs.

The flow chart represented in FIG. 6 applies to the control of the production of glass tubes analogously to that described previously:

the voltage drop is detected the moment the glass tube is cut off;

the controller 28 applies to the unit 23, which is a compressor here, the correction signal calculated in the preceding cycle for the correction of the variation of the pressure. At the same time, with the aid of an optical sensor 54, the error of the diameter of the tube is measured to define the extent of the disturbance;

based on the error signal Er(n), the controller 28 calculates the new correction signal to be applied at the next cycle in the same fashion as has been described previously.

The invention has been described in the case of two different examples showing the diversity of the fields of application of the invention. In a general manner, the invention may control any servo system for which a disturbing event generates an error that can be measured in one of the parameters which characterize the servo system, said error being reproduced in a substantially identical manner with each of the appearances of the disturbing event which it gives rise to.

The term shock should be broadly construed so as to include any form of disturbance which may suddenly occur and which is of a relatively short duration.

What is claimed is:

1. A method comprising the steps of:

providing corrective data contained in a memory;

detecting a shock; and compensating for an error caused by the shock, depending on the corrective data, the compensation being initiated by the detection of the shock.

2. The method of claim 1, further comprising the steps of:

measuring the error while the error is being reduced so as to obtain a measured error; and updating the corrective data in the memory depending on the measured error.

3. The method of claim 2, further comprising the steps of:

transforming the measured error into supplementary corrective data which would have further reduced the error; and adding the supplementary corrective data to the corrective data so as to obtain updated corrective data;

and in which the updating includes writing the updated corrective data into the memory.

4. The method of claim 1, in which the corrective data depends on measurements of errors due to previous shocks.

5. The method of claim 1, in which the timing of the occurrence of the shock is at least partially random.

6. An information read-out arrangement comprising:

an information read-out element for reading information stored on an information carrier;

a positioning system for positioning the information read-out element with respect to the carrier;

a detector for detecting a shock;

a memory for storing corrective data; and compensator means for providing a compensation signal to the positioning system for compensating for a positioning error caused by the shock, the compensation signal depending on the corrective data and the compensation signal being initiated by the detection of the shock.

7. The arrangement of claim 6, in which the timing of the occurrence of the shock is at least partially random.

8. A servo system comprising:

a memory for storing corrective data;

a detector for detecting a shock; and compensator means for compensating for an error caused by the shock, depending on the corrective data and being initiated by the detection of the shock.

9. The servo system of claim 8, in which the timing of the occurrence of the shock is at least partially random.

10. A controller comprising:

a memory for storing corrective data;

an input for a detector signal depending on the detection of a shock; and compensator means for providing a compensation signal for compensating for an error caused by the shock, the signal depending on the corrective data in the memory and being initiated by the detection of the shock.

11. The controller of claim 10, in which the timing of the occurrence of the shock is at least partially random.

\* \* \* \* \*